US010922535B2

(12) United States Patent
Song

(10) Patent No.: US 10,922,535 B2
(45) Date of Patent: Feb. 16, 2021

(54) METHOD AND DEVICE FOR IDENTIFYING WRIST, METHOD FOR IDENTIFYING GESTURE, ELECTRONIC EQUIPMENT AND COMPUTER-READABLE STORAGE MEDIUM

(71) Applicant: BOE TECHNOLOGY GROUP CO., LTD., Beijing (CN)

(72) Inventor: Zhenkun Song, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 107 days.

(21) Appl. No.: 16/203,915

(22) Filed: Nov. 29, 2018

(65) Prior Publication Data
US 2019/0332858 A1 Oct. 31, 2019

(30) Foreign Application Priority Data
Apr. 27, 2018 (CN) ............................ 201810391614

(51) Int. Cl.
*G06K 9/00* (2006.01)
*G06T 7/73* (2017.01)

(52) U.S. Cl.
CPC ..... *G06K 9/00355* (2013.01); *G06K 9/00523* (2013.01); *G06K 9/00536* (2013.01); *G06T 7/74* (2017.01); *G06T 2207/30196* (2013.01)

(58) Field of Classification Search
CPC ........... G06K 9/00355; G06K 9/00375; G06K 9/00523; G06K 9/00536; G06K 9/4609;
(Continued)

(56) References Cited

U.S. PATENT DOCUMENTS 8,971,637 B1 * 3/2015 Rivard ...................... G06T 7/13
382/199
2011/0234840 A1 * 9/2011 Klefenz ............... G06K 9/4633
348/222.1
(Continued)

FOREIGN PATENT DOCUMENTS

CN 103226387 A 7/2013
CN 104063059 A 9/2014
(Continued)

OTHER PUBLICATIONS

First Office Action for Chinese Application No. 201810391614.5, dated May 25, 2020, 6 Pages.

*Primary Examiner* — Margaret G Mastrodonato
(74) *Attorney, Agent, or Firm* — Brooks Kushman P.C.

(57) ABSTRACT

The present disclosure provides a method and a device for identifying a wrist, a method for identifying a gesture, electronic equipment and a computer-readable storage medium. The method includes: obtaining a first image, the first image including a hand and the wrist; binarizing the first image to obtain a binary image; extracting a partial image from the binary image, where the partial image is obtained by removing at least of finger information from the binary image; identifying a principal direction of the binary image based on the partial image, and determining a target direction perpendicular to the principal direction; and determining a target position in the binary image where the binary image matches a first wrist feature as a wrist position in the binary image according to the target direction.

16 Claims, 11 Drawing Sheets

(58) Field of Classification Search
CPC ................ G06K 9/4633; G06K 9/4647; G06T 2207/30196; G06T 7/13; G06T 7/246; G06T 7/73
See application file for complete search history.

(56) References Cited

U.S. PATENT DOCUMENTS

| | | | |
|---|---|---|---|
| 2014/0240213 A1* | 8/2014 | Alaniz | G06F 3/017 345/156 |
| 2015/0089455 A1* | 3/2015 | Yamada | G06F 3/011 715/863 |
| 2016/0026857 A1* | 1/2016 | Petyushko | G06K 9/00389 382/103 |
| 2016/0078289 A1* | 3/2016 | Michel | G06K 9/00355 345/156 |
| 2016/0283784 A1 | 9/2016 | Kounavis et al. | |
| 2019/0206052 A1* | 7/2019 | Hu | G06T 5/40 |

FOREIGN PATENT DOCUMENTS

| | | |
|---|---|---|
| CN | 104766055 A | 7/2015 |
| CN | 105893929 A | 8/2016 |
| WO | 2012005893 A2 | 1/2012 |

* cited by examiner

METHOD AND DEVICE FOR IDENTIFYING WRIST, METHOD FOR IDENTIFYING GESTURE, ELECTRONIC EQUIPMENT AND COMPUTER-READABLE STORAGE MEDIUM

CROSS-REFERENCE TO RELATED APPLICATION

This application claims priority to Chinese Patent Application No. 201810391614.5 filed on Apr. 27, 2018, which is incorporated herein by reference in its entirety.

TECHNICAL FIELD

The present disclosure relates to the field of image processing technologies, in particular to a method and a device for identifying a wrist, a method for identifying a gesture, electronic equipment and a computer-readable storage medium.

BACKGROUND

With the development of science and technology, gesture identification is increasingly required in application scenarios, so as to perform corresponding operations according to a result of the gesture identification. The gesture identification technology in the related art cannot distinguish a gesture from an arm in an image effectively, and the arm in the image may interfere with the gesture identification, thereby reducing the accuracy of the gesture identification.

SUMMARY

In a first aspect, embodiments of the present disclosure provide a method for identifying a wrist, which includes:
  obtaining a first image, the first image including a hand and the wrist;
  binarizing the first image to obtain a binary image;
  extracting a partial image from the binary image, where the partial image is obtained by removing at least of finger information from the binary image;
  identifying a principal direction of the binary image based on the partial image, and determining a target direction perpendicular to the principal direction; and
  determining a target position in the binary image where the binary image matches a first wrist feature as a wrist position in the binary image according to the target direction.

In a second aspect, the embodiments of the present disclosure further provide a method for identifying a gesture, which includes:
  determining the wrist position using the method for identifying a wrist according to the first aspect;
  segmenting the binary image along the wrist position to obtain a gesture image; and
  identifying the gesture on the gesture image.

In a third aspect, the embodiments of the present disclosure further provide a device for identifying a wrist. The device includes a memory, a processor and a program that is stored on the memory and executable by the processor. When the program is executed by the processor, the processor is configured to:
  obtain a first image, the first image including a hand and a wrist;
  binarize the first image to obtain a binary image;
  extract a partial image of the binary image, where the partial image is obtained by removing at least of finger information from the binary image;
  identify a principal direction of the binary image based on the partial image, and determine a target direction perpendicular to the principal direction; and
  determine a target position in the binary image where the binary image matches a first wrist feature as a wrist position in the binary image according to the target direction.

In a fourth aspect, the embodiments of the present disclosure further provide electronic equipment, including a memory, a processor and a program that is stored on the memory and executable by the processor. When the program is executed by the processor, the processor is configured to:
  determining the wrist position using the method for identifying a wrist according to the first aspect;
  segmenting the binary image along the wrist position to obtain a gesture image; and
  identifying the gesture on the gesture image.

In a fifth aspect, the embodiments of the present disclosure further provide a computer-readable storage medium storing a program. When the program is executed by a processor, the method for identifying a wrist according to the embodiments of the present disclosure is implemented.

In a sixth aspect, the embodiments of the present disclosure further provide a computer-readable storage medium storing a program. When the program is executed by the processor, the method for identifying a gesture according to the embodiments of the present disclosure is implemented.

DETAILED DESCRIPTION

In order to make the technical problem to be solved, the technical solutions and the advantages of the present disclosure more apparent, the present disclosure will be described hereinafter in detail in conjunction with the drawings and embodiments.

Figure 1:
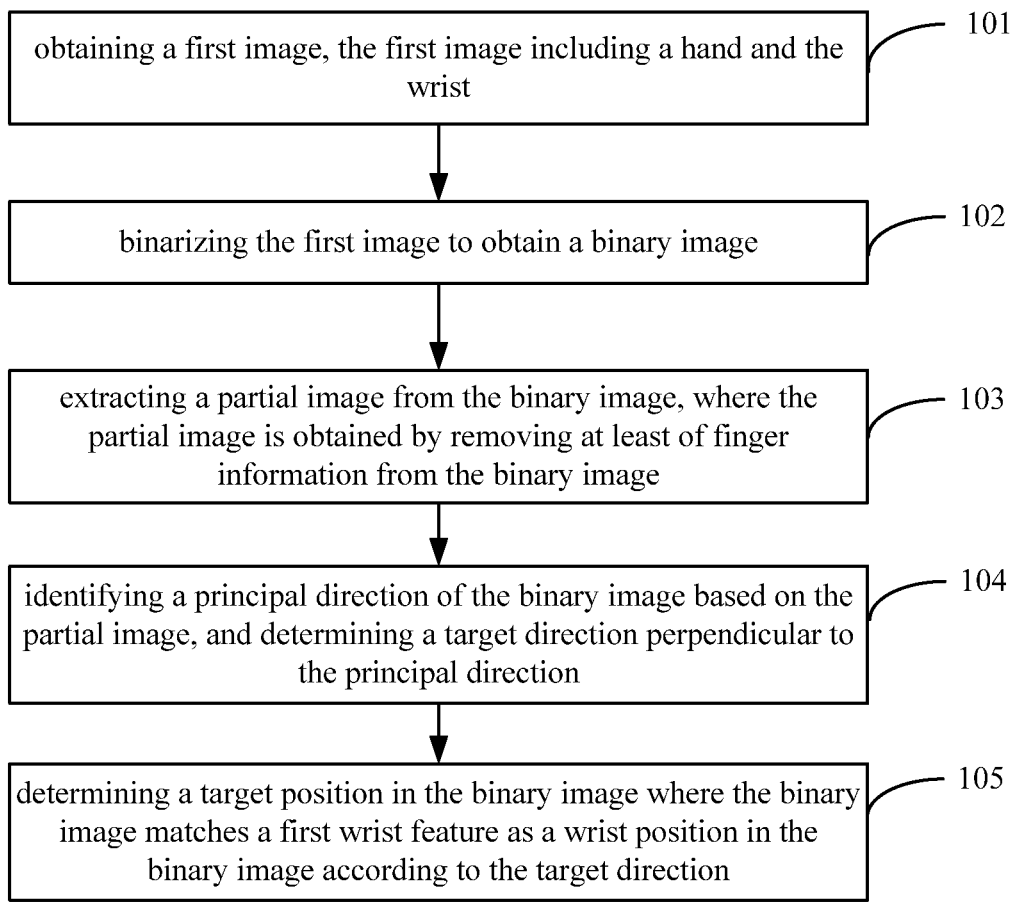
FIG. 1 is a flow chart of a wrist identification method according to at least one embodiment of the present disclosure.

FIG. 1 is a flow chart of a wrist identification method according to at least one embodiment of the present disclosure. As shown in FIG. 1, the method includes the following steps:

step 101: obtaining a first image, the first image including a hand and the wrist;

step 102: binarizing the first image to obtain a binary image;

step 103: extracting a partial image from the binary image, where the partial image is obtained by removing at least of finger information from the binary image;

step 104: identifying a principal direction of the binary image based on the partial image, and determining a target direction perpendicular to the principal direction; and step 105: determining a target position in the binary image where the binary image matches a first wrist feature as a wrist position in the binary image according to the target direction.

The above-mentioned first image may be obtained by collecting an image of a human hand through an image collecting device, such as a camera. In the embodiment of the present disclosure, when the obtained first image is binarized, the color first image obtained by the image collecting device may be directly binarized. The first image contains image information such as fingers, a palm and a wrist.

It should be noted that the wrist identification method according to the embodiment of the present disclosure may be applied to any electronic equipment capable of identifying images, such as a mobile phone, a tablet PC, a computer, a game device, an intelligent control device or a TV, which is not limited herein. In addition, the electronic equipment applying the method may or may not include an image collecting device. If included, the image collecting device may collect the above-mentioned first image; if not included, the above-mentioned first image may be collected by other electronic equipment and then sent to the electronic equipment.

Figure 2:
FIG. 2 is a schematic diagram of a binary image according to at least one embodiment of the present disclosure.
Figure 3:
FIG. 3 is a schematic diagram of a gesture image according to at least one embodiment of the present disclosure.

In the step of binarizing the first image to obtain a binary image, a gray value of a pixel point on the above-mentioned first image may be converted into 0 or 255, i.e., the entire first image is converted into a monochrome image. FIG. 2 is a schematic diagram of a binary image of the hand according to at least one embodiment of the present disclosure. In FIG. 2, the first image is a binary image obtained by binarizing the color first image of the hand using the binarizing method based on a skin color model. As shown in FIG. 2, besides the gesture image, the binary image further includes part of an arm image. As shown in FIG. 3, the gesture image may start from the wrist and include the palm and fingers. The arm in FIG. 2 may disturb the identification of the gesture image. In the practical application, the first image may be segmented into the gesture image and the arm image firstly, and then the gesture identification is performed according to the segmented gesture image, which may avoid the interference of the arm, and improve the accuracy of gesture identification. The wrist exists between the gesture image and the arm image, so an effective wrist identification method is the key of improving gesture identification.

Usually, the collected first images may have different visual angles, which may affect the segmentation of the gesture image and the arm image. Therefore, it needs to determine an overall orientation of the first image, i.e., an overall direction of the above-mentioned binary image, referred to as the principal direction. The principal direction is also an extension direction from the arm to the wrist and palm. In addition, the above-mentioned binary image may be symmetrical about the above-mentioned principal direction approximately. In the embodiment of the present disclosure, the detection mode may be to extract a hand contour in the binary image, and determine the principal direction of the hand contour, which refers to the following description of the embodiment, and is not limited herein certainly. For example, a middle line of the binary image may be taken as the above-mentioned principal direction, but the accuracy of this method is lower than the accuracy of identifying the principal direction by detecting a line segment of the contour of the binary image.

In the embodiment of the present disclosure, the preset wrist feature may be defined in advance. For example, the above-mentioned preset wrist feature is that a width of the contour changes the most violently. Since the above-mentioned target direction is perpendicular to the above-mentioned principal direction, the width of the contour the binary image may be understood as its length in the target direction. In this way, the target position where the width changes the most violently may be determined by the above-mentioned target direction. For example, from FIGS. 2, 3 and 5, it may be determined that the human hand is characterized by extending from the arm to the palm, from the arm to the wrist, with a little change in the width of the human hand, and an obvious change in the width at the wrist position, i.e., the position which is perpendicular to the above-mentioned principal direction and has a violent change in width of the contour. Certainly, the above-mentioned width changing the most violently is merely an example. For example, the above-mentioned preset wrist feature may also be changing gently and then suddenly towards two sides. The two sides herein are those of the above-mentioned target direction, thereby determining the target position changing gently and then suddenly towards the two sides in the binary image by the above-mentioned target direction. For example, from FIG. 2, it may be determined that the wrist position is the one which changes gently and then suddenly towards two sides.

The above-mentioned preset wrist feature may further be an end point of a line segment parallel with the above-mentioned principal direction. In this way, the line segment of the contour in the binary image may be detected, and the line segment of an arm edge parallel with the above-mentioned principal direction may be selected, thereby taking the end point of the line segment of the arm edge and the position parallel with the above-mentioned target direction as the wrist position, in which the end point is close to the palm direction.

It should be noted that the wrist identification method according to the embodiment of the present disclosure may be applied to the gesture identification method based on image processing, for example, to a gesture identification system of a classifier based on template matching or a neural network. In this way, before the gesture feature is calculated, the wrist identification method according to the embodiment of the present disclosure accurately identifies the wrist position, thereby improving the accuracy of gesture identification.

In the embodiment of the present disclosure, a first image is obtained; the first image is binarized, so as to obtain a binary image; an partial image in the binary image is extracted; a principal direction of the binary image is identified based on the partial image, and a target direction perpendicular to the principal direction is determined; a target position in the binary image where the binary image matches a first wrist feature as a wrist position in the binary image according to the target direction. In this way, the wrist position may be determined effectively, thereby improving the accuracy of gesture identification.

Figure 4:
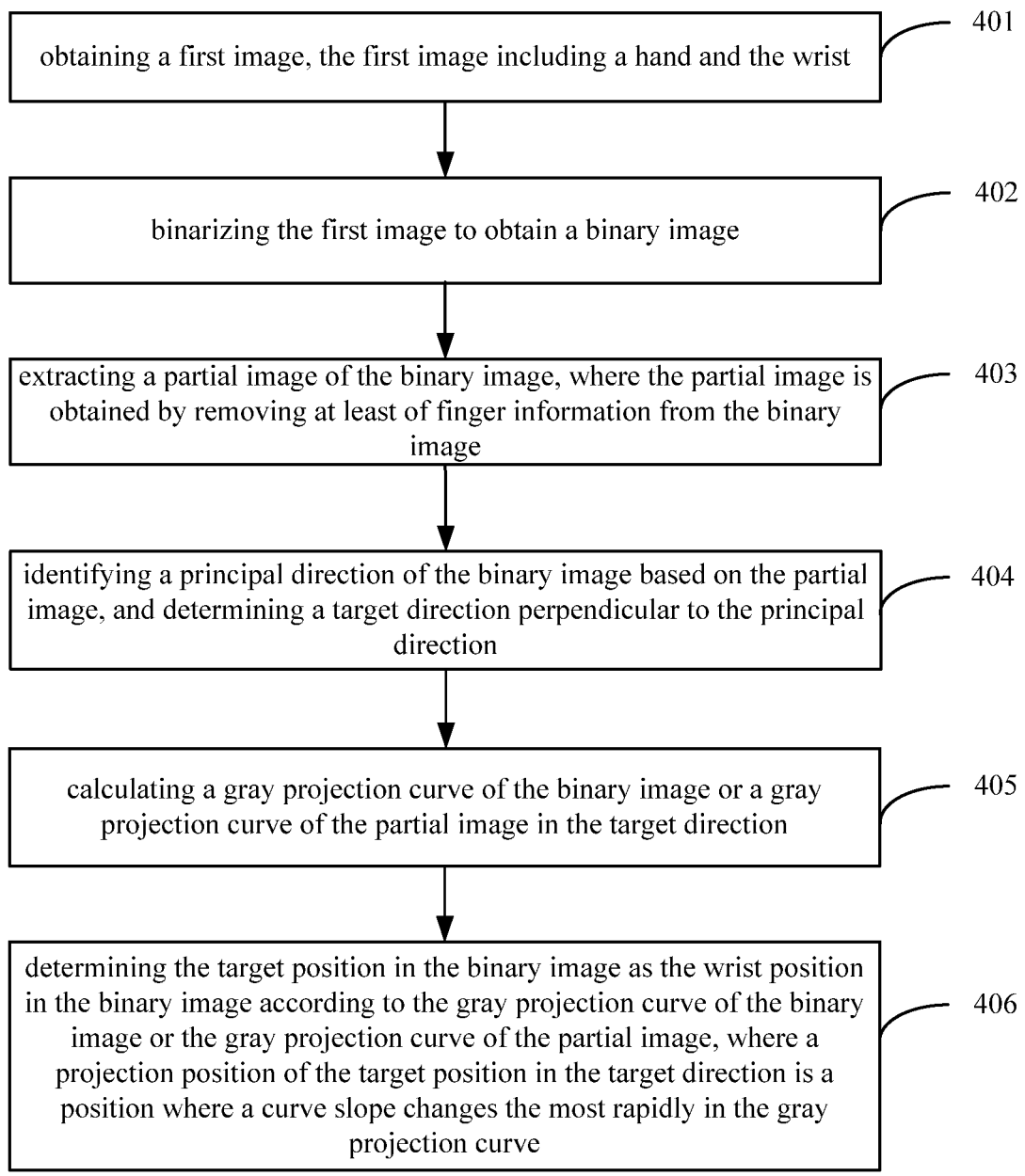
FIG. 4 is a flow chart of a wrist identification method according to at least one embodiment of the present disclosure.

FIG. 4 is a flow chart of a wrist identification method according to at least one embodiment of the present disclosure. As shown in FIG. 4, the method includes the following steps:

step 401: obtaining a first image, the first image including a hand and the wrist;

step 402: binarizing the first image to obtain a binary image;

step 403: extracting a partial image of the binary image, where the partial image is obtained by removing at least of finger information from the binary image;

step 404: identifying a principal direction of the binary image based on the partial image, and determining a target direction perpendicular to the principal direction;

405: calculating a gray projection curve of the binary image or a gray projection curve of the partial image in the target direction; and 406: determining the target position in the binary image as the wrist position in the binary image according to the gray projection curve of the binary image or the gray projection curve of the partial image, where a projection position of the target position in the target direction is a position where a curve slope changes the most rapidly in the gray projection curve.

Figure 5:
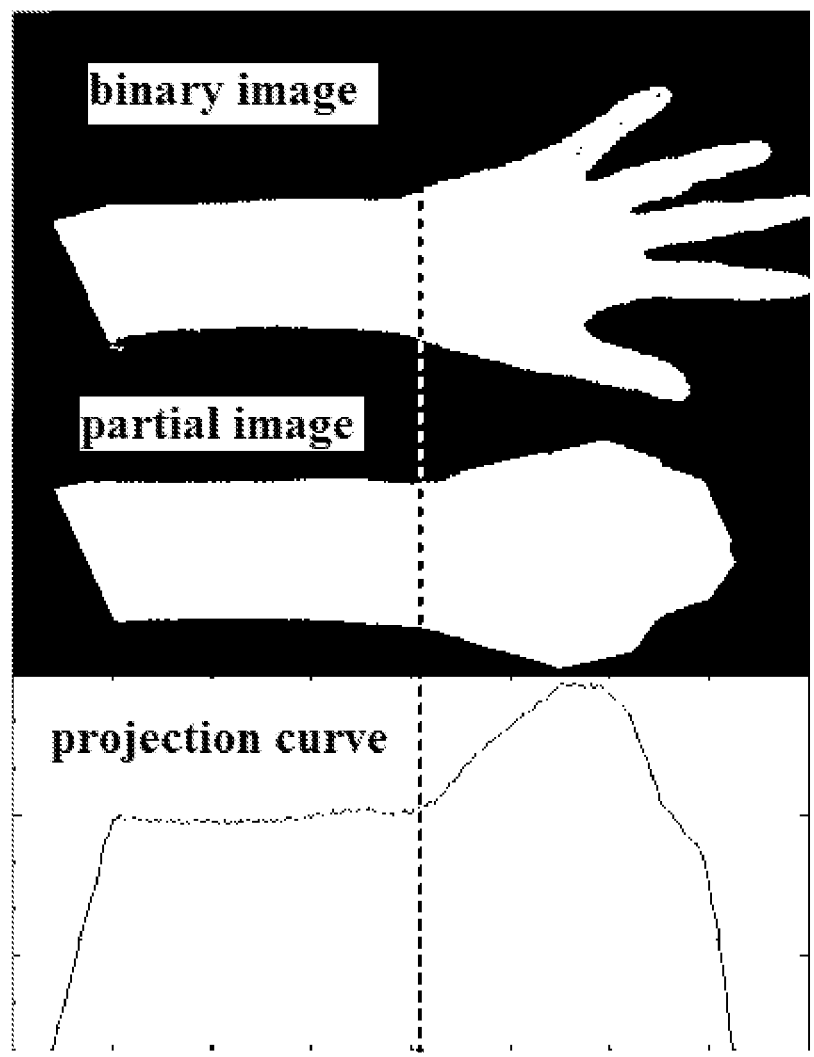
FIG. 5 is schematic diagram of a gray projection curve according to at least one embodiment of the present disclosure.

In the step of calculating the gray projection curve of the binary image or the partial image in the target direction, the binary image or the partial image is rotated. For example, the binary image or the partial image is rotated by a target angle which is an included angle between the principal direction and a preset reference direction, which may change the principal direction of the rotated binary image or the partial image to be the preset reference direction, thereby calculating the gray projection curve of the binary image or the partial image in the target direction. The above-mentioned preset reference direction may be a vertical direction or a horizontal direction. Certainly, rotation may not be performed. For example, the gray projection curve of the binary image or the partial image in the target direction may be calculated directly. By rotation, the gray projection curve may take the horizontal direction or the vertical direction as a reference, which is more readable by persons skilled in the art. For example, as shown in FIG. 5, an abscissa is parallel with the horizontal direction, and represents that the gray projection curve extends in the principal direction; an ordinate is parallel with the vertical direction, and represents numerical values on the gray projection curve, which in this way may make the abscissa of the gray projection curve parallel with the horizontal direction, more readable by persons skilled in the art.

In the embodiment of the present disclosure, it is assumed that a pixel matrix of the binary image has a size of A*B. As shown in FIG. 5, the principal direction of the hand is a row direction of the image, and the target direction is a column direction of the image. In case of calculating the gray projection curve, a number of each row in the pixel matrix is the abscissa x; the ordinate y of this row is obtained by calculating a sum of gray values of B pixels of each row in the binary image matrix. In this way, A (x, y) coordinates are connected into a curve, so as to obtain the gray projection curve in the column direction, i.e., the gray projection curve in the target direction. After the above-mentioned gray projection curve is calculated, the position where the slope changes the most rapidly in the gray projection curve may be determined, and understood as the position where the change is the most violent. The human hand is characterized by extending from the arm to the palm, from the arm to the wrist, with a little change in the width of the human hand, and an obvious change in the width at the wrist position, i.e., the projection position of the wrist of the binary image in the target direction is the position where the slope in the gray projection curve changes the most rapidly.

By the steps 405 and 406, the target position corresponding to the position where the slope in the gray projection curve changes the most rapidly in the binary image may be determined as the wrist position, thereby improving the accuracy of wrist identification.

It should be noted that in the present embodiment, the gray projection curve of the binary image or the partial image in the above-mentioned target direction may be calculated. However, since the partial image is a partial image in the binary image, after the above-mentioned target position of the partial image is determined, the target position in the above-mentioned binary image may be directly determined because the two positions are the same. In addition, since the gray projection curve of the partial image in the target direction may be calculated, the wrong identification caused by the arm image with different numbers of fingers may be avoided because if there is one less finger, at the finger position, the position with the most rapid change in slope may be generated in the gray projection curve, thereby further improving the accuracy of wrist identification.

As one optional embodiment, before the step of determining the target position in the binary image as the wrist position of the binary image according to the gray projection curve, the method further includes:

calculating a second derivative of the gray projection curve, where the position where the curve slope changes the most rapidly in the gray projection curve is a position corresponding to a maximum value of the second derivative in the gray projection curve; or calculating a first derivative of the gray projection curve, where the position where the curve slope changes the most rapidly in the gray projection curve is a position corresponding to a maximum value of the curve slopes of the first derivative in the gray projection curve.

Figure 6:
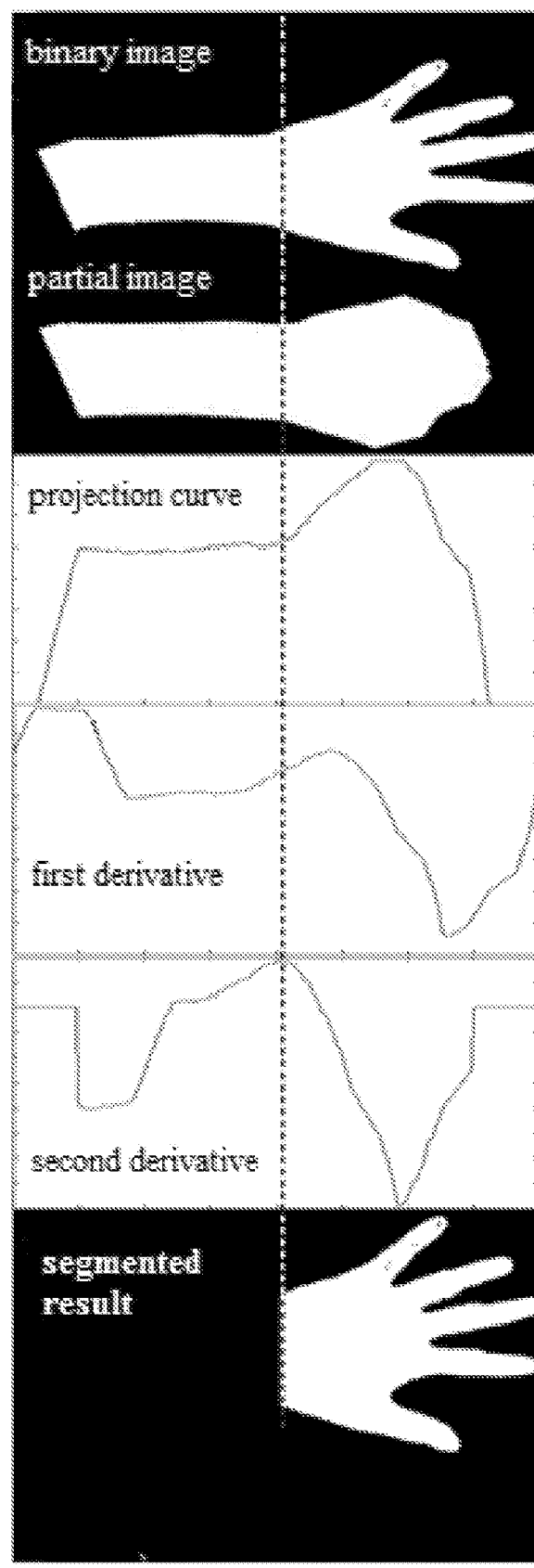
FIG. 6 is schematic diagram of a gray projection curve and a derivative curve according to at least one embodiment of the present disclosure.

In the present embodiment, the projection position of the target position in the binary image in the target direction is the position of the maximum value in the second derivative, determined as the wrist position. For example, FIG. 6 shows the binary image, the partial image, the gray projection curve of the partial image, the first and second derivatives of the gray projection curve, and the gesture image. In FIG. 6, a two-dimensional coordinate system may be established. The ordinates in the gray projection curve, the first derivative and the second derivative represent numerical values of respective curves, and the abscissas represent that the gray projection curve, the first derivative and the second derivative extend in the principal direction. In this way, after the maximum value in the second derivative is determined, the abscissa value (such as the abscissa value shown by the imaginary line as shown in FIG. 6) corresponding to the maximum value may be determined, thereby determining the target position of this abscissa value in the binary image as the wrist position.

In addition, in the above-mentioned first derivative, the position with the maximum value of the curve slope may be determined by calculating the curve slope of each position in the first derivative, thereby determining the abscissa value (such as the abscissa value shown by the imaginary line) corresponding to the position with the maximum value of the curve slope, and then determining the target position of the abscissa value in the binary image as the wrist position.

In the present embodiment, since the wrist position may be determined by the position of the maximum value of the second derivative or the maximum value of the curve slope in the first derivative, thereby improving the accuracy of determining the wrist position, and the accuracy of gesture identification.

For example, the human hand is characterized by extending from the arm to the palm, from the arm to the wrist, with a little change in the width of the human hand, and an obvious change in the width at the wrist position. Correspondingly, in the first image, in the direction perpendicular to the principal direction, the position where the width in the binary image changes the most violently is the wrist, thereby finding the wrist position, and segmenting the gesture image and the arm image based on the wrist position. In the present embodiment, the wrist position may be determined by the method based on the projection curve. After the principal direction is determined, the binary image and the partial image are rotated by an angle of θ (for example, the included angle between the principal direction and horizontal direction), such that the principal direction of the gesture image becomes the horizontal direction, and then the vertical direction of the rotated partial image, the gray projection curve, the first and second derivatives of the gray projection curve are calculated respectively, as shown in FIG. 6. At the wrist position, the gray projection curve changes the most violently. That is, the slope of the gray projection curve changes the most rapidly, i.e., the first derivative curve of the projection curve changes the most rapidly. The position where the first derivative curve changes the most rapidly is the position of the maximum value of the slope of the first derivative curve, which is the position of the maximum value of the second derivative curve of the projection curve.

In some optional embodiments, the maximum value is the maximum of the second derivatives within a search region, in which the search region is a remaining region of the x-coordinates obtained by removing a first equal value region and a last equal value region from the second derivative. The first equal value region ranges from the first x-coordinate, the x-coordinates of the first equal value region are continuous, and the second derivatives under the continuous x-coordinates of the first equal value region have a same value equal to a value of the second derivative under the first x-coordinate. The last equal value region ends up with the last x-coordinate, the x-coordinates of the last equal value region are continuous, and the second derivatives under the continuous x-coordinates of the last equal value region have a same value equal to a value of the second derivative under the last x-coordinate.

The above-mentioned first and the last equal value regions may be referred to as the second derivative regions corresponding to two zero points of the projection curve because the second derivative region at the position of zero point of the projection curve is the equal value region, for example, the first line segment and the last line segment in the second derivative parallel to a horizontal line as shown in FIG. 6.

In practical applications, the projection curve may change violently at the two ends of the image. Therefore, at the two ends of the binary image, the gray projection value increases from the zero and finally reduces to zero, thereby causing the maximum value point of the second derivative of the projection curve to appear at the two ends of the image. In this way, in the present embodiment, the maximum value is the one within the above-mentioned search region of the second derivative, which may avoid the maximum value of the second derivative to be at the two sides of the projection curve, so as to improve the accuracy of determining the wrist position. Since in the normal first image, the wrist position is definitely located between two zero points, the maximum value of the second derivative of the projection curve is searched in a small region, to determine the wrist position, thereby improving the accuracy of determining the wrist position.

As one optional embodiment, before the step of calculating the gray projection curve of the partial image in the target direction, the method further includes:

performing an opening operation on the binary image, at least removing the finger information and noise part, so as to obtain the partial image.

Figure 7:
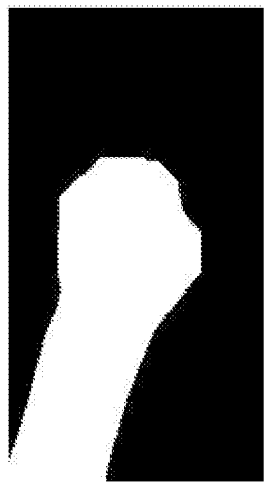
FIG. 7 is a schematic diagram of a partial image of the binary image according to at least one embodiment of the present disclosure.

The above-mentioned opening operation is morphological, which includes an erosion operation on the binary image for removing information of smaller objects, and a dilation operation for restoring a shape of the remaining objects, so as to obtain the partial image from which at least the finger part and the noise part are removed. Specifically, referring to the change in FIGS. 2 and 7, FIG. 2 shows the binary image, and FIG. 7 shows the partial image extracted from the binary image shown in FIG. 2 by performing the opening operation. Certainly, the opening operation is performed on the above-mentioned binary image, to remove the finger part and the noise part, and image information of other small parts, for determining the principal direction and the wrist position subsequently.

In the present embodiment, the partial image is obtained by the opening operation on the binary image to remove the finger part and the noise part, thereby improving the accuracy of determining the principal direction and the wrist direction from the partial image, and improving the accuracy of gesture identification.

It should be noted that in the present embodiment of the present disclosure, it is not limited that the above-mentioned partial image is obtained by the opening operation. For example, the finger part of the binary image may be removed by a Hough circle detection method or a neural network approach, so as to obtain the above-mentioned partial image.

As one of the optional embodiments, the step of identifying the principal direction of the partial image includes:

detecting N line segments of a contour of the partial image, and calculating a length of each of the N line segments and an included angle between each of the N line segments and a reference direction, where N is a positive integer, and the N line segments represent the contour of the hand and the wrist;

determining a target angle according to the lengths of the N line segments, and the included angles between the N line segments and the reference direction; and determining the principal direction of the partial image according to the target angle, the target angle being an included angle between the principal direction and the reference direction.

Figure 8:
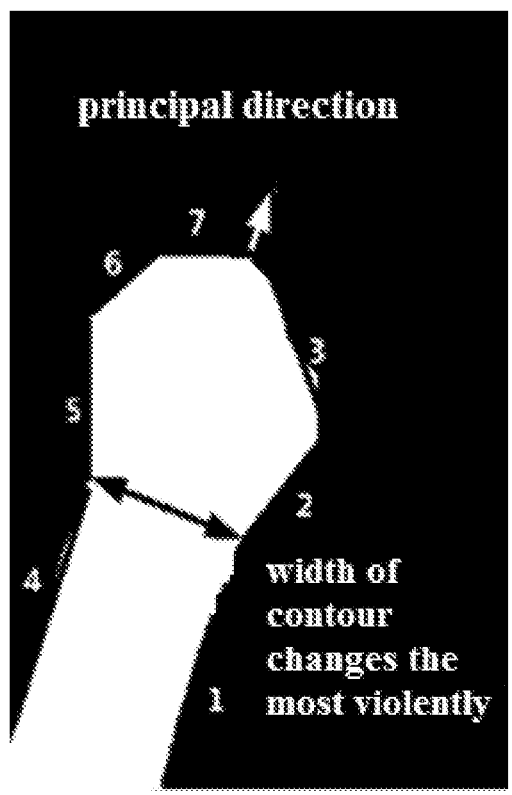
FIG. 8 is a schematic diagram of a principal direction of the partial image according to at least one embodiment of the present disclosure.

In the step of detecting N line segments of a contour of the partial image, the contour of the partial image is determined by the gray value of each pixel point in the partial image, because the arm part and the hand part each has a gray value of 255, and the other part in partial image has a gray value of 0. Afterwards, N line segments of the contour of the above-mentioned partial image may be detected by the Hough transform line segment detection method or the Line Segment Detector (LSD) method. The above-mentioned N line segments may be seven line segments as shown in FIG. 8. Certainly, there may be more line segments. The larger the number of line segments, the closer the calculated principal direction of the binary image to reality, and the greater the computational load. In practical applications, the number of line segments may be set reasonably as needed.

The above-mentioned preset reference direction may be the horizontal direction or the vertical direction, or other directions, which is not limited in the present disclosure. In the drawings in the embodiments of the present disclosure, the preset reference direction is taken as the horizontal direction.

The step of determining a target angle according to the lengths of the N line segments, and the included angles between the N line segments and the reference direction may include:

calculating the target angle through dividing a sum of weighted included angles of the N line segments by a sum of lengths of the N line segments, in which the weighted included angle of the i-th line segment is a product of the included angle between the i-th line segment and the reference direction, and the length of the i-th line segment, and i is any integer ranging from 1 to N.

The sum of the weighted included angles may be that of the N line segments. Since the weighted included angle of the i-th line segment is the product obtained by multiplying the included angle between the line segment and the preset reference direction by the length of the i-th line segment, thereby taking the length of each line segment as a weighted value of this line segment. Since in practice, the part with a greater length has a greater influence on the principal direction, the accuracy of the principal direction may be improved.

For example, as shown in FIG. 8, in the embodiment of the present disclosure, in view of the structural characteristics of the human hand, the partial image is symmetrical about the principal direction approximately. Therefore, the principal direction of the first image is determined according to the length and the direction of each line segment in the image, and the principal direction of the first image is similar to the direction of the longest line segment (for example, when the arm in the image is relatively big, the principal direction of the image is similar to the direction of the two line segments of the arm edge, and the line segments 1 and 4 are line segments of the arm edge). That is, for the relatively longer line segment, its direction (for example, the included angle with the horizontal direction) has a relatively large influence on the principal direction of the first image.

Therefore, in the embodiment of the present disclosure, the principal direction of the first image may be determined using the weighted average method, in which the length of each line segment is taken as a weighting coefficient. The longer the line segment, the greater the weighting coefficient corresponding to its direction. Taking FIG. 8 as an example, there are mainly 7 line segments. It is easy to calculate the lengths of the 7 line segments $l_1, l_2, l_3, \ldots l_7$, and the included angles $\theta_1, \theta_2, \theta_3, \ldots \theta_7$ between the 7 line segments and the horizontal direction. By taking the length of each line segment as the weighting coefficient, the weighted average result of the directions of the 7 line segments is calculated, thereby determining the principal direction of the arm and the gesture image with the following formula:

$$\theta = \frac{\sum_{i=1}^{7} l_i \times \theta_i}{\sum_{i=1}^{7} l_i}.$$

In the above-mentioned formula, the length $l_i$ of each line segment is taken as the weighting coefficient of its direction (for example, the included angle $\theta_i$ with the horizontal direction). The numerator is a weighted sum of directions of the seven line segments (for example, the included angle with the horizontal direction), and the denominator is the sum of seven weighting coefficients, taking the final weighted average result $\theta$ as the included angle between the principal direction and the preset reference direction (such as the horizontal direction).

Certainly, in the embodiment of the present disclosure, the step of determining the target angle according to the lengths of the N line segments and the included angles between the N line segments and the preset reference direction is not limited to the method of dividing a sum of weighted included angles of the N line segments by a sum of lengths of the N line segments. For example, an average value of the included angles between the two longest line segments of the N line segments and the preset reference direction may also be taken as the above-mentioned target angle, which is not limited herein.

In the embodiment shown in FIG. 4, the wrist position of the binary image is determined by the position where the slope changes the most rapidly in the gray projection curve, thereby accurately determining the wrist position, and further improving the accuracy of gesture identification.

Figure 9:
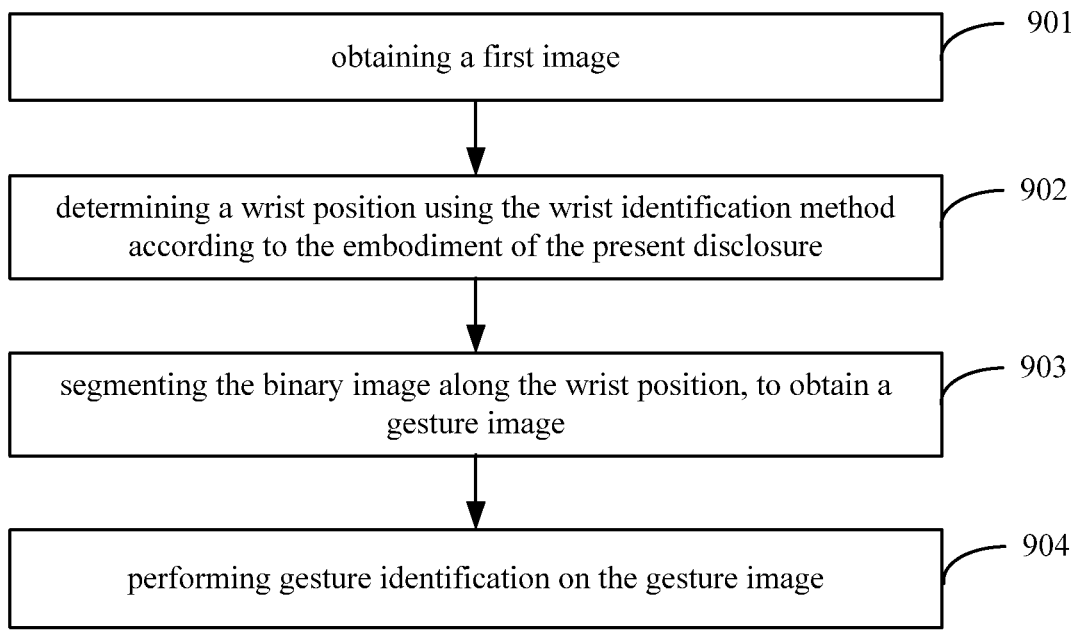
FIG. 9 is a flow chart of a gesture identification method according to at least one embodiment of the present disclosure.

FIG. 9 is a flow chart of a gesture identification method according to at least one embodiment of the present disclosure. As shown in FIG. 9, the method includes the following steps 901 to 904.

Step 901: obtaining a first image.

Step 902: determining a wrist position using the wrist identification method according to the embodiment of the present disclosure.

Step 903: segmenting the binary image along the wrist position, to obtain a gesture image.

Step 904: performing gesture identification on the gesture image.

It should be noted that the step 902 of determining the wrist position may refer to the embodiments shown in FIGS. 1 to 4, which is not repeated herein.

In the present embodiment, after the wrist position is determined, the binary image is segmented, to obtain the gesture image, thereby performing gesture identification on this gesture image, for example, identifying a trajectory of change or size or space position of the gesture image, which is not limited herein.

The binary image is segmented along the wrist position, to obtain the gesture image, which may prevent the arm image from interfering with the gesture identification, improving the accuracy of gesture identification.

It should be noted that the gesture identification method according to the embodiment of the present disclosure may be applied to any electronic equipment capable of identifying images, such as a mobile phone, a tablet PC, a computer, a game device, an intelligent control device or a TV, which is not limited herein.

In the present embodiment, since the wrist position may be determined accurately, and the binary image is segmented along the wrist position, and the arm part may be removed, thereby avoiding the influence of the arm part on the gesture identification, so as to improve the accuracy of gesture identification.

Figure 10:
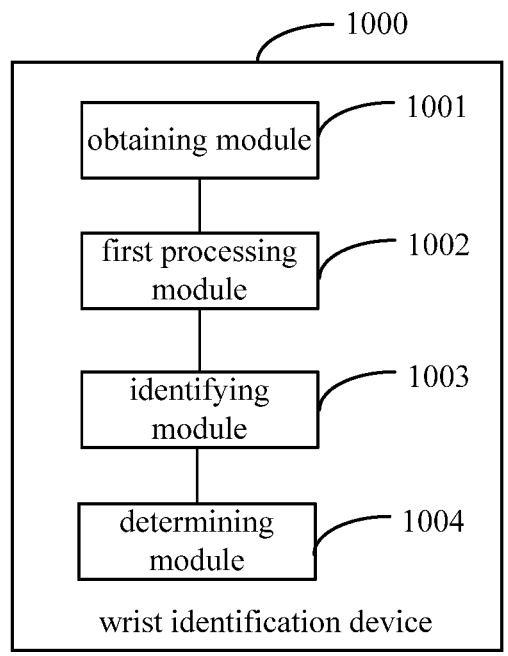
FIG. 10 is a structural schematic diagram of a wrist identification device according to at least one embodiment of the present disclosure.

FIG. 10 is a structural diagram of a wrist identification device according to at least one embodiment of the present disclosure. As shown in FIG. 10, the wrist identification device 1000 includes:

an obtaining module 1001, configured to obtain a first image, the first image including a hand and a wrist;

a first processing module 1002, configured to binarize the first image to obtain a binary image, and extract a partial image from the binary image, where the partial image is obtained by removing at least of finger information from the binary image;

an identifying module 1003, configured to identify a principal direction of the binary image based on the partial image, and determine a target direction perpendicular to the principal direction; and a determining module 1004, configured to determine a target position in the binary image where the binary image matches a first wrist feature as a wrist position in the binary image according to the target direction.

Figure 11:
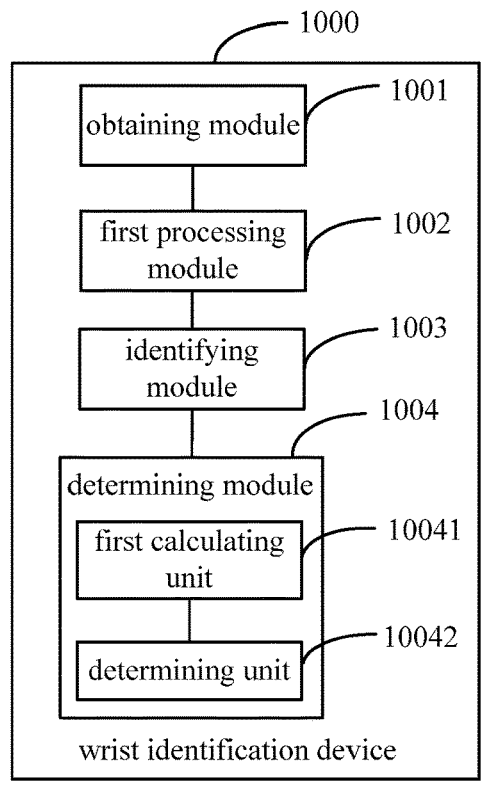
FIG. 11 is a structural schematic diagram of a wrist identification device according to at least one embodiment of the present disclosure.

In some optional embodiments, as shown in FIG. 11, the determining module 1004 includes:

a first calculating unit 10041, configured to calculate a gray projection curve of the binary image or a gray projection curve of the partial image in the target direction; and a determining unit 10042, configured to determine the target position in the binary image as the wrist position in the binary image according to the gray projection curve of the binary image or the gray projection curve of the partial image, where a projection position of the target position in the target direction is a position where a curve slope changes the fastest in the gray projection curve.

Figure 12:
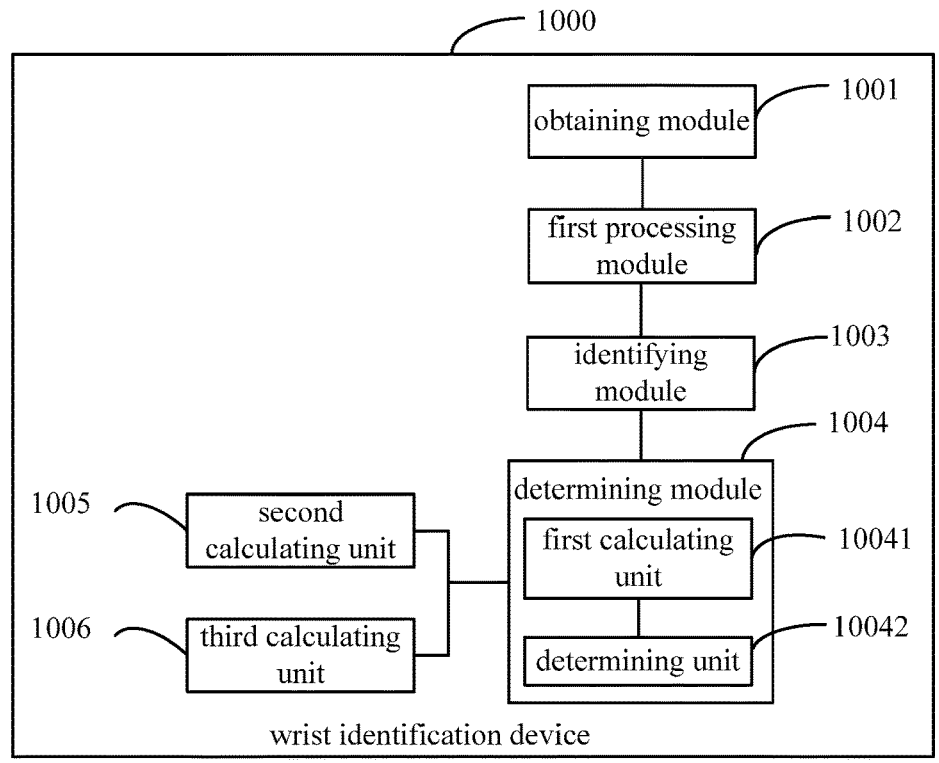
FIG. 12 is a structural schematic diagram of a wrist identification device according to at least one embodiment of the present disclosure.

In some optional embodiments, as shown in FIG. 12, the device further includes:

a second calculating unit 1005, configured to calculate a second derivative of the gray projection curve, where the position where the curve slope changes the fastest in the gray projection curve is a position corresponding to a maximum value of the second derivative in the gray projection curve; or a third calculating unit 1006, configured to determine the target position in the binary image as the wrist position in the binary image according to the gray projection curve of the binary image or the gray projection curve of the partial image, where a projection position of the target position in the target direction is a position where a curve slope changes the fastest in the gray projection curve.

Figure 13:
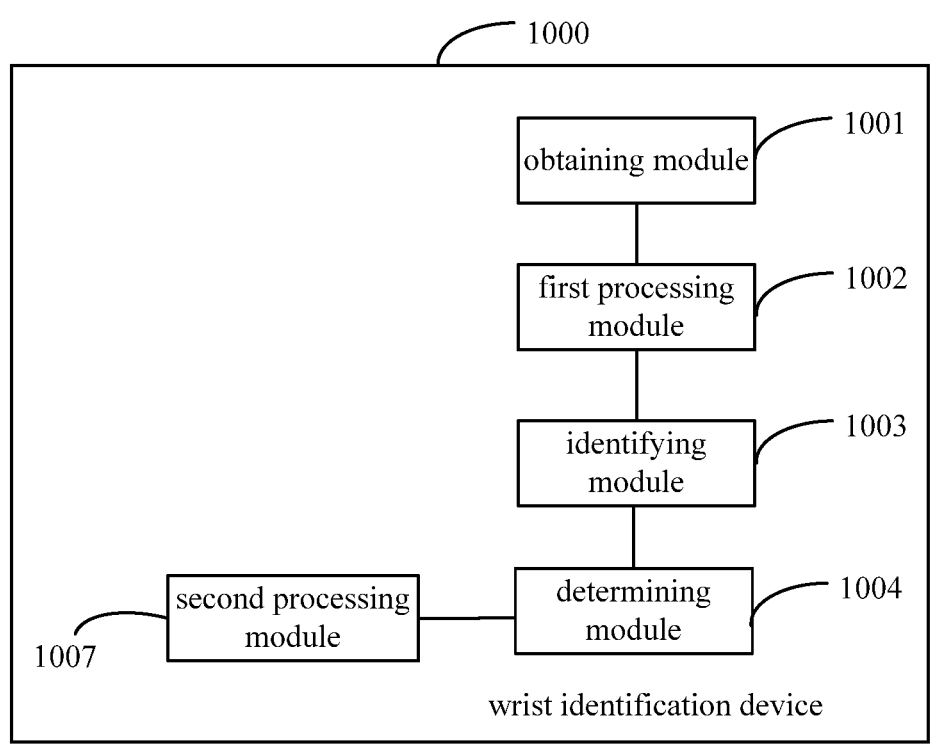
FIG. 13 is a structural schematic diagram of a wrist identification device according to at least one embodiment of the present disclosure.

In some optional embodiments, as shown in FIG. 13, the device further includes:

a second processing module 1007, configured to perform an opening operation on the binary image to remove at least of the finger information and a noise, so as to obtain the partial image.

Figure 14:
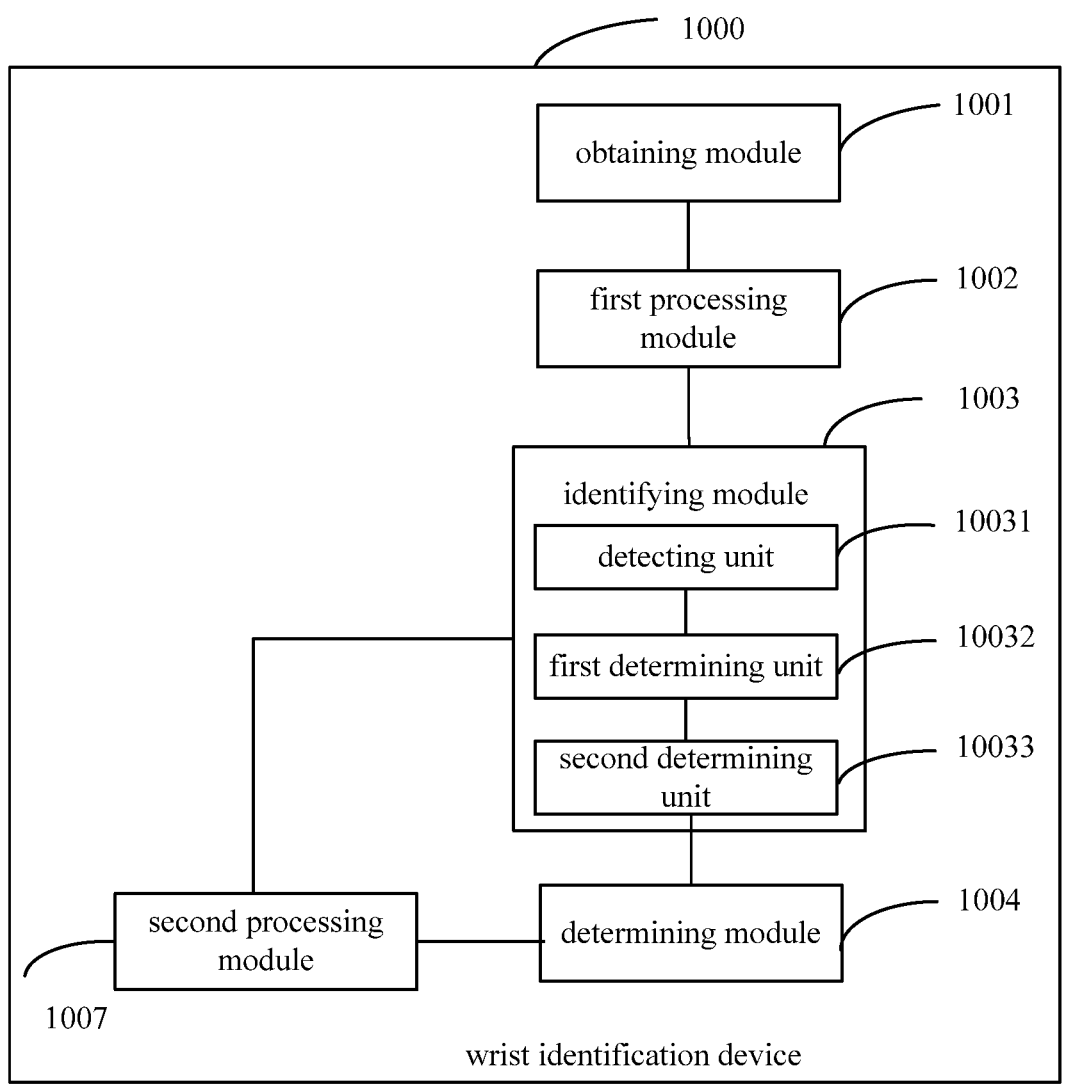
FIG. 14 is a structural schematic diagram of a wrist identification device according to at least one embodiment of the present disclosure.

In some optional embodiments, as shown in FIG. 14, the identifying module 1003 includes:

a detecting unit 10031, configured to detect N line segments of a contour of the partial image, and calculate a length of each of the N line segments and an included angle between each of the N line segments and a reference direction, where N is a positive integer, and the N line segments represent the contour of the hand and the wrist;

a first determining unit 10032, configured to determine a target angle according to the lengths of the N line segments, and the included angles between the N line segments and the reference direction; and a second determining unit 10033, configured to determine the principal direction of the partial image according to the target angle, the target angle being an included angle between the principal direction and the reference direction.

In some optional embodiments, the first determining unit 10032 is configured to take the angle obtained by dividing a sum of weighted included angles of the N line segments by a sum of lengths of the N line segments as the target angle, in which the weighted included angle of the i-th line segment is a product obtained by multiplying the included angle between the i-th line segment and the preset reference direction by the length of the i-th line segment, and i is any one integer from 1 to N.

In some optional embodiments, the principal direction is a row direction of the binary image, the target direction is a column of the binary image, x-coordinates of the gray projection curve are continuous column numbers of the binary image, and a y-coordinate of the gray projection curve under any one of the x-coordinates is a sum of gray values of all pixels of in the corresponding column of the binary image. The maximum value is the maximum value of the second derivatives of the gray projection curve within a search region, and the search region is a remaining region of the x-coordinates obtained by removing a first equal value region and a last equal value region from the second derivative. The first equal value region ranges from the first x-coordinate, the x-coordinates of the first equal value region are continuous, and the second derivatives under the continuous x-coordinates of the first equal value region have a same value equal to a value of the second derivatives under the first x-coordinate. The last equal value region ends up with the last x-coordinate, the x-coordinates of the last equal value region are continuous, and the second derivatives under the continuous x-coordinates of the last equal value region have a same value equal to a value of the second derivative under the last x-coordinate.

It should be noted that the above-mentioned wrist identification device 1000 in the present embodiment may implement the wrist identification method in any embodiment of the present disclosure. That is, the wrist identification method according to any embodiment of the present disclosure may be implemented by the above-mentioned wrist identification device 1000 in the present embodiment, and achieve the same advantageous effects, which is not repeated herein.

Figure 15:
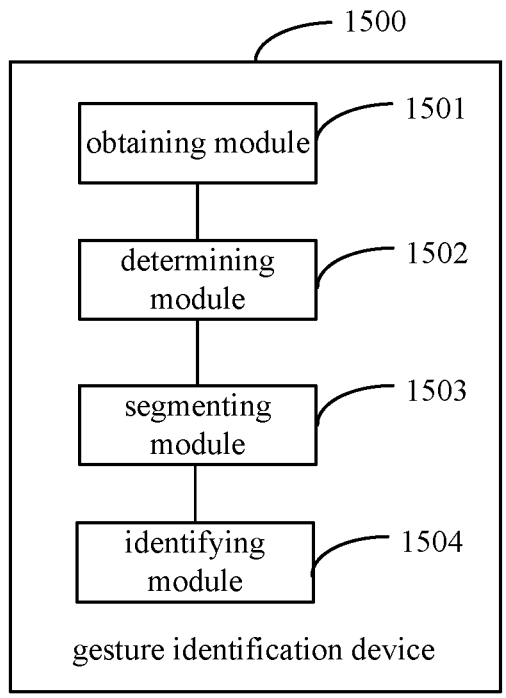
FIG. 15 is a structural schematic diagram of a gesture identification device according to at least one embodiment of the present disclosure.

FIG. 15 is a structural diagram of a gesture identification device according to at least one embodiment of the present disclosure. As shown in FIG. 15, the gesture identification device includes:

an obtaining module 1501, configured to obtain a first image, the first image including a hand and a wrist;

a determining module 1502, configured to determine the wrist position using the wrist identification according to the embodiment of the present disclosure;

a segmenting module 1503, configured to segment the binary image along the wrist position, to obtain a gesture image; and an identifying module 1504, configured to perform gesture identification on the gesture image.

It should be noted that the above-mentioned gesture identification device 1500 in the present embodiment may implement the gesture identification method in any embodiment of the present disclosure. That is, the gesture identification method according to any embodiment of the present disclosure may be implemented by the above-mentioned gesture identification device 1500 in the present embodiment, and achieve the same advantageous effects, which is not repeated herein.

Figure 16:
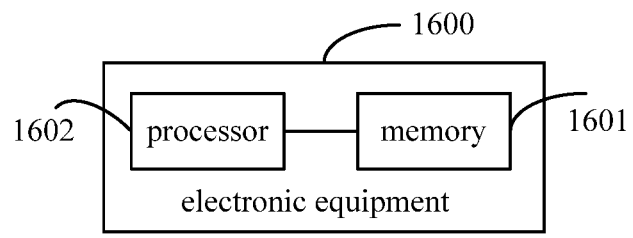
FIG. 16 is a structural schematic diagram of electronic equipment according to at least one embodiment of the present disclosure.

Reference is made to FIG. 16, which is a structural schematic diagram of electronic equipment according to at least one embodiment of the present disclosure. The electronic equipment 1600 includes: a memory 1601, a processor 1602 and a computer program which is stored on the memory 1601 and executable by the processor 1602. The processor 1602 is configured to read the computer program in the memory 1601 and perform the following processes:

obtaining a first image, the first image including a hand and the wrist;

binarizing the first image to obtain a binary image;

extracting a partial image from the binary image, where the partial image is obtained by removing at least of finger information from the binary image;

identifying a principal direction of the binary image based on the partial image, and determining a target direction perpendicular to the principal direction; and determining a target position in the binary image where the binary image matches a first wrist feature as a wrist position in the binary image according to the target direction.

In some embodiments, in determining a target position in the binary image where the binary image matches a first wrist feature as a wrist position in the binary image according to the target direction, the processor 1602 is further configured to:

calculate a gray projection curve of the binary image or a gray projection curve of the partial image in the target direction; and determine the target position in the binary image as the wrist position in the binary image according to the gray projection curve of the binary image or the gray projection curve of the partial image, where a projection position of the target position in the target direction is a position where a curve slope changes the fastest in the gray projection curve.

In some optional embodiments, prior to the determining a target position in the binary image where the binary image matches a first wrist feature as a wrist position in the binary image according to the target direction, the processor 1602 is further configured to:

calculate a second derivative of the gray projection curve, where the position where the curve slope changes the fastest in the gray projection curve is a position corresponding to a maximum value of the second derivative in the gray projection curve; or calculate a first derivative of the gray projection curve, where the position where the curve slope changes the fastest in the gray projection curve is a position corresponding to a maximum value of the curve slopes of the first derivative in the gray projection curve.

In some optional embodiments, prior to the calculating a gray projection curve of the partial image in the target direction, the processor 1602 is further configured to:

perform an opening operation on the binary image to remove at least of the finger information and a noise, so as to obtain the partial image.

In some optional embodiments, in identifying a principal direction of the binary image based on the partial image, the processor 1602 is further configured to:

detect N line segments of a contour of the partial image, and calculating a length of each of the N line segments and an included angle between each of the N line segments and a reference direction, where N is a positive integer, and the N line segments represent the contour of the hand and the wrist;

determine a target angle according to the lengths of the N line segments, and the included angles between the N line segments and the reference direction; and determine the principal direction of the partial image according to the target angle, the target angle being an included angle between the principal direction and the reference direction.

In some optional embodiments, in determining a target angle according to the lengths of the N line segments, and the included angles between the N line segments and the reference direction, the processor 1602 is further configured to:

calculate the target angle through dividing a sum of weighted included angles of the N line segments by a sum of lengths of the N line segments, in which the weighted included angle of the i-th line segment is a product of the included angle between the i-th line segment and the reference direction, and the length of the i-th line segment, and i is any integer ranging from 1 to N.

In some optional embodiments, the principal direction is a row direction of the binary image, the target direction is a column of the binary image, x-coordinates of the gray projection curve are continuous column numbers of the binary image, and a y-coordinate of the gray projection curve under any one of the x-coordinates is a sum of gray values of all pixels of in the corresponding column of the binary image. The maximum value is the maximum value of the second derivatives of the gray projection curve within a search region, and the search region is a remaining region of the x-coordinates obtained by removing a first equal value region and a last equal value region from the second derivative. The first equal value region ranges from the first x-coordinate, the x-coordinates of the first equal value region are continuous, and the second derivatives under the continuous x-coordinates of the first equal value region have a same value equal to a value of the second derivatives under the first x-coordinate. The last equal value region ends up with the last x-coordinate, the x-coordinates of the last equal value region are continuous, and the second derivatives under the continuous x-coordinates of the last equal value region have a same value equal to a value of the second derivative under the last x-coordinate.

It should be noted that the above-mentioned electronic equipment 1600 in the present embodiment may implement the wrist identification method in any embodiment of the present disclosure. That is, the wrist identification method according to any embodiment of the present disclosure may be implemented by the above-mentioned electronic equipment 1600 in the present embodiment, and achieve the same advantageous effects, which is not repeated herein.

Figure 17:
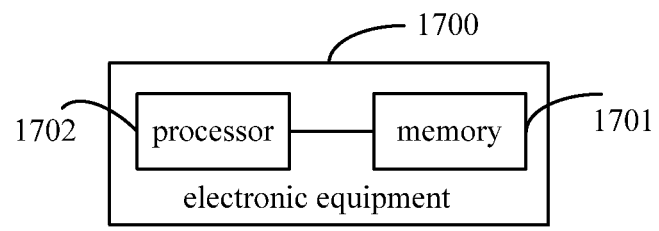
FIG. 17 is a structural schematic diagram of electronic equipment according to at least one embodiment of the present disclosure.

Reference is made to FIG. 17, which is a structural schematic diagram of electronic equipment according to at least one embodiment of the present disclosure. The electronic equipment 1700 includes: a memory 1701, a processor 1702 and a computer program which is stored on the memory 1701 and executable by the processor 1702. The processor 1702 is configured to read the computer program in a memory 1701 to execute the following processes:

obtaining a first image, the first image including a hand and a wrist;

determining the wrist position using the wrist identification according to the embodiments of the present disclosure;

segmenting the binary image along the wrist position, to obtain a gesture image; and performing gesture identification on the gesture image.

It should be noted that the above-mentioned electronic equipment 1700 in the present embodiment may implement the gesture identification method in any embodiment of the present disclosure. That is, the gesture identification method according to any embodiment of the present disclosure may be implemented by the above-mentioned electronic equipment 1700 in the present embodiment, and achieve the same advantageous effects, which is not repeated herein.

At least one embodiment of the present disclosure further provides a computer-readable storage medium storing a computer program. When the computer program is executed by the processor, steps in the wrist identification method or the gesture identification method according to the embodiments of the present disclosure are implemented.

It should be noted that, various units or modules included in the devices of the above embodiments are divided only according to logical functions, but not limited to the above division manner, as long as it can implement corresponding functions. In addition, names of various functional units or modules are only for ease of distinction, but not to limit the protection scope of the present disclosure.

It may be understood by those skilled in the art, all or part of steps implementing the above-described embodiments may be completed by hardware instructed by relevant program instructions, which can be stored in a computer readable storage medium. The above-mentioned storage medium may be a read-only memory, a disk or a CD etc.

The above descriptions are merely optional embodiments of the present disclosure. It should be noted that several improvements and modifications may be made for a person skilled in the art without departing from the principle of the present disclosure, and also should be considered to fall within the protection scope of the present disclosure.

What is claimed is:

1. A method for identifying a wrist, comprising:
obtaining a first image, the first image comprising a hand and the wrist;
binarizing the first image to obtain a binary image;
extracting a partial image from the binary image, wherein the partial image is obtained by removing at least of finger information from the binary image;
identifying a principal direction of the binary image based on the partial image, and determining a target direction perpendicular to the principal direction; and
determining a target position in the binary image where the binary image matches a first wrist feature as a wrist position in the binary image according to the target direction,
wherein the identifying a principal direction of the binary image based on the partial image comprises:
detecting N line segments of a contour of the partial image, and calculating a length of each of the N line segments and an included angle between each of the N line segments and a reference direction, wherein N is a positive integer, and the N line segments represent the contour of the hand and the wrist;
determining a target angle according to the lengths of the N line segments, and the included angles between the N line segments and the reference direction; and
determining the principal direction of the partial image according to the target angle, the target angle being an included angle between the principal direction and the reference direction,
wherein the determining a target angle according to the lengths of the N line segments, and the included angles between the N line segments and the reference direction comprises: calculating the target angle by dividing a sum of weighted included angles of the N line segments by a sum of lengths of the N line segments, in which the weighted included angle of the i-th line segment is a product of the included angle between the i-th line segment and the reference direction, and the length of the i-th line segment, and i is any integer ranging from 1 to N.

2. The method according to claim 1, wherein the determining a target position in the binary image where the binary image matches a first wrist feature as a wrist position in the binary image according to the target direction comprises:
calculating a gray projection curve of the binary image or a gray projection curve of the partial image in the target direction; and
determining the target position in the binary image as the wrist position in the binary image according to the gray projection curve of the binary image or the gray projection curve of the partial image, wherein a projection position of the target position in the target direction is a position where a curve slope changes the fastest in the gray projection curve.

3. The method according to claim 2, wherein prior to the determining a target position in the binary image where the binary image matches a first wrist feature as a wrist position in the binary image according to the target direction, the method further comprises:
calculating a second derivative of the gray projection curve, wherein the position where the curve slope changes the fastest in the gray projection curve is a position corresponding to a maximum value of the second derivative in the gray projection curve; or
calculating a first derivative of the gray projection curve, wherein the position where the curve slope changes the fastest in the gray projection curve is a position corresponding to a maximum value of the curve slopes of the first derivative in the gray projection curve.

4. The method according to claim 3, wherein prior to the calculating a gray projection curve of the partial image in the target direction, the method further comprises:
performing an opening operation on the binary image to remove at least of the finger information and a noise, so as to obtain the partial image.

5. The method according to claim 3, wherein the principal direction is a row direction of the binary image, the target direction is a column of the binary image, x-coordinates of the gray projection curve are continuous column numbers of the binary image, and a y-coordinate of the gray projection curve under any one of the x-coordinates is a sum of gray values of all pixels of in the corresponding column of the binary image,
wherein the maximum value is the maximum value of the second derivatives of the gray projection curve within a search region, and the search region is a remaining region of the x-coordinates obtained by removing a first equal value region and a last equal value region from the second derivative, and wherein the first equal value region ranges from the first x-coordinate, the x-coordinates of the first equal value region are continuous, and the second derivatives under the continuous x-coordinates of the first equal value region have a same value equal to a value of the second derivative under the first x-coordinate, and wherein the last equal value region ends up with the last x-coordinate, the x-coordinates of the last equal value region are continuous, and the second derivatives under the continuous x-coordinates of the last equal value region have a same value equal to a value of the second derivative under the last x-coordinate.

6. The method according to claim 2, wherein prior to the calculating a gray projection curve of the partial image in the target direction, the method further comprises:

performing an opening operation on the binary image to remove at least of the finger information and a noise, so as to obtain the partial image.

7. The method according to claim 1, wherein the determining a target angle according to the lengths of the N line segments, and the included angles between the N line segments and the reference direction comprises:

determining the target angle θ according to a formula as following:

$$\theta = \frac{\sum_{i=1}^{7} l_i \times \theta_i}{\sum_{i=1}^{7} l_i}$$

where $l_i$ is the length of the i-th line segment, $\theta_i$ is the included angle between the i-th line segment and the reference direction, and $1 \leq i \leq N$.

8. A method for identifying a gesture, comprising:
determining the wrist position using the method for identifying a wrist according to claim 1;
segmenting the binary image along the wrist position to obtain a gesture image; and
identifying the gesture on the gesture image.

9. A non-transitory computer-readable storage medium, storing a computer program, wherein when the computer program is executed by a processor, the method for identifying a gesture according to claim 8 is implemented.

10. Electronic equipment, comprising a memory, a processor and a program that is stored on the memory and executable by the processor; wherein when the program is executed by the processor, the processor is configured to:
determine the wrist position using the method for identifying a wrist according to claim 1;
segment the binary image along the wrist position, to obtain a gesture image; and
identify the gesture on the gesture image.

11. A non-transitory computer-readable storage medium, storing a computer program, wherein when the computer program is executed by a processor, the method for identifying a wrist according to claim 1 is implemented.

12. A device for identifying a gesture, comprising a memory, a processor and a program that is stored on the memory and executable by the processor, wherein when the program is executed by the processor, the processor is configured to:

obtain a first image, the first image comprising a hand and a wrist;
binarize the first image to obtain a binary image;
extract a partial image from the binary image, wherein the partial image is obtained by removing at least of finger information from the binary image;
identify a principal direction of the binary image based on the partial image, and determine a target direction perpendicular to the principal direction; and
determine a target position in the binary image where the binary image matches a first wrist feature as a wrist position in the binary image according to the target direction,
wherein in identifying a principal direction of the binary image based on the partial image, the processor is further configured to:
detect N line segments of a contour of the partial image, and calculate a length of each of the N line segments and an included angle between each of the N line segments and a reference direction, wherein N is a positive integer, and the N line segments represent the contour of the hand and the wrist;
determine a target angle according to the lengths of the N line segments, and the included angles between the N line segments and the reference direction; and
determine the principal direction of the partial image according to the target angle, the target angle being an included angle between the principal direction and the reference direction,
wherein the determining a target angle according to the lengths of the N line segments, and the included angles between the N line segments and the reference direction comprises: calculating the target angle by dividing a sum of weighted included angles of the N line segments by a sum of lengths of the N line segments, in which the weighted included angle of the i-th line segment is a product of the included angle between the i-th line segment and the reference direction, and the length of the i-th line segment, and i is any integer ranging from 1 to N.

13. The device according to claim 12, wherein in determining a target position in the binary image where the binary image matches a first wrist feature as a wrist position in the binary image according to the target direction, the processor is further configured to:
calculate a gray projection curve of the binary image or a gray projection curve of the partial image in the target direction; and
determine the target position in the binary image as the wrist position in the binary image according to the gray projection curve of the binary image or the gray projection curve of the partial image, wherein a projection position of the target position in the target direction is a position where a curve slope changes the fastest in the gray projection curve.

14. The device according to claim 13, wherein, prior to the determining a target position in the binary image where the binary image matches a first wrist feature as a wrist position in the binary image according to the target direction, the processor is further configured to:
calculate a second derivative of the gray projection curve, wherein the position where the curve slope changes the fastest in the gray projection curve is a position corresponding to a maximum value of the second derivative in the gray projection curve; or
calculate a first derivative of the gray projection curve, wherein the position where the curve slope changes the fastest in the gray projection curve is a position corresponding to a maximum value of the curve slope of the first derivative in the gray projection curve.

15. The device according to claim 14, wherein the principal direction is a row direction of the binary image, the target direction is a column of the binary image, x-coordinates of the gray projection curve are continuous column numbers of the binary image, and a y-coordinate of the gray projection curve under any one of the x-coordinates are a sum of gray values of all pixels of in the corresponding column of the binary image, wherein the maximum value is the maximum value of the second derivatives of the gray projection curve within a search region, and the search region is a remaining region of the x-coordinates obtained by removing a first equal value region and a last equal value region from the second derivative, and wherein the first equal value region ranges from the first x-coordinate, the x-coordinates of the first equal value region are continuous, and the second derivatives under the continuous x-coordinates of the first equal value region have a same value equal to a value of the second derivatives under the first x-coordinate, and wherein the last equal value region ends up with the last x-coordinate, the x-coordinates of the last equal value region are continuous, and the second derivatives under the continuous x-coordinates of the last equal value region have a same value equal to a value of the second derivatives under the last x-coordinate.

16. The device according to claim 12, wherein in determining a target angle according to the lengths of the N line segments, and the included angles between the N line segments and the reference direction, the processor is further configured to determine the target angle $\theta$ according to a formula as following:

$$\theta = \frac{\sum_{i=1}^{7} l_i \times \theta_i}{\sum_{i=1}^{7} l_i}$$

where $l_i$ is the length of the i-th line segment, $\theta_i$ is the included angle between the i-th line segment and the reference direction, and $1 \leq i \leq N$.

* * * * *